Figure 1:
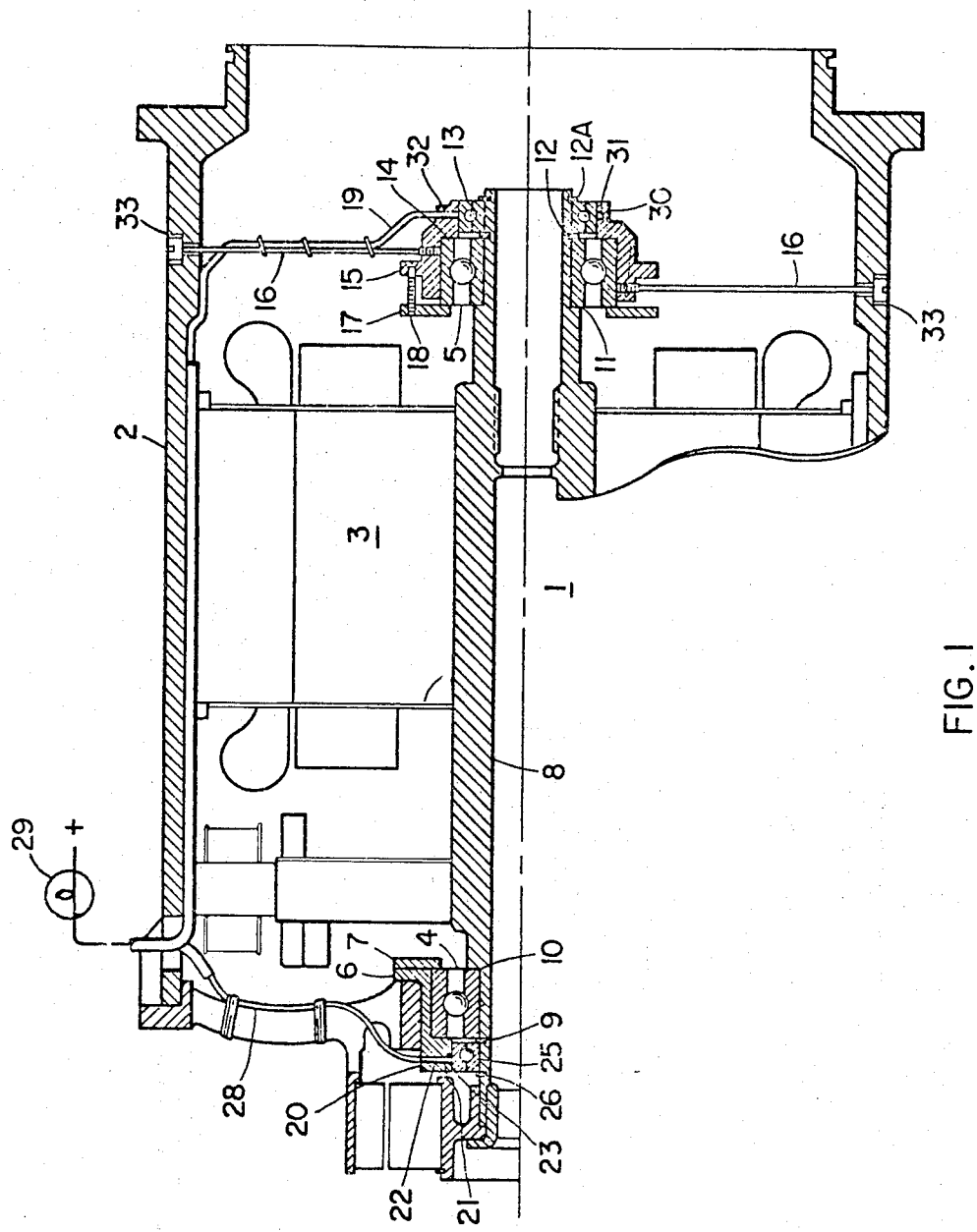

United States Patent [19]
Potter

[11] 3,777,195
[45] Dec. 4, 1973

[54] SUPPORT FOR GENERATOR BEARING
[75] Inventor: Frederick Milton Potter, Little Silver, N.J.
[73] Assignee: The Bendix Corporation, Teterboro, N.J.
[22] Filed: Feb. 8, 1972
[21] Appl. No.: 224,491

[52] U.S. Cl. .................................. 310/91, 308/189
[51] Int. Cl. ..................... B61f 17/00, F16c 35/00
[58] Field of Search ................. 310/91; 308/15, 22, 308/189, 178

[56] References Cited
UNITED STATES PATENTS
2,885,583   5/1959   Zunick et al. ...................... 308/189

Primary Examiner—Manuel A. Antonakas
Assistant Examiner—Frank Susko
Attorney—S. H. Hartz et al.

[57] ABSTRACT

A support for a bearing for mounting a shaft for rotation relative to a member wherein the shaft and member have different temperature coefficients in which the bearing is supported firmly in a hub and a plurality of spokes support the hub from the member to prevent movement of the bearing relative to the member in a radial direction and permit limited movement of the bearing relative to the member in an axial direction to accommodate unequal changes in dimensions of the shaft and member due to temperature.

9 Claims, 2 Drawing Figures

SUPPORT FOR GENERATOR BEARING

The invention relates to electrical generators and more particularly to supports for the bearings mounting the generator rotor.

Aircraft generators as used heretofore, particularly high power 400 cycle A.C. generators, use magnesium or aluminum cast housings and end bells in order to minimize weight. Thin steel liners provide the support for the ball bearing outer races. The outer race of one bearing, usually at the anti-drive end of the generator, is locked tightly against a shoulder to hold the rotor in a predetermined position axially relative to the stator. The bearing at the opposite end, usually the drive end, is secured to prevent rotation of the outer race but the bearing is allowed to float axially to accommodate dimensional changes due to different temperature coefficients of the alloy housing and steel shaft. The bearing outer race normally has approximately 0.0005 inches clearance at 75° F to permit relative axial movement. When the generator is heated as a result of continuous operation at rated full load, the drive end bearing and the associated thin steel liner may reach temperatures of 300° F whereupon the magnesium aluminum end bell and thin steel liner expand more than the bearing outer race so that a clearance of up to 0.0020 inches results between the bearing outer race and liner. This extra clearance permits the rotor to move off center and cause unbalanced magnetic forces resulting in extra loading on the bearing. In addition, the rotor may bounce due to external vibration forces and this, of course, results in rapid internal wear of the bearing.

It has been found in airline service that the floating bearing at one end of the shaft wears at a much more rapid rate than the clamped or locked bearing at the opposite end of the shaft.

One object of the present invention is to provide a generator in which both bearings are secured firmly and tightly in their supports.

Another object is to provide a bearing support which accommodates axial dimensional changes of the relatively rotatable members due to temperature changes.

Another object is to provide a support for one bearing which is firm in a radial direction and relatively flexible in an axial direction.

Another object is to provide a bearing support which has a hub supported by a plurality of high tensile spokes.

Another object is to accomodate different dimensional changes of the generator housing and steel hub of the support due to temperature changes by prestressing the spokes which support the hub from the housing.

Another object is to prestress the spokes at room temperature to such a value that at least a small tension still remains in the spokes at the coldest operating temperature.

The invention contemplates a support for a bearing for mounting one end of a generator rotor and comprises a hub rigidly mounting the outer race of the bearing and a plurality of spokes for mounting the hub in the generator housing. The spokes are formed and arranged to provide a firm support for the bearing radially and a relatively flexible support for the bearing axially to accommodate dimensional changes due to different temperature coefficients of the rotor shaft and generator housing.

Figure 2:
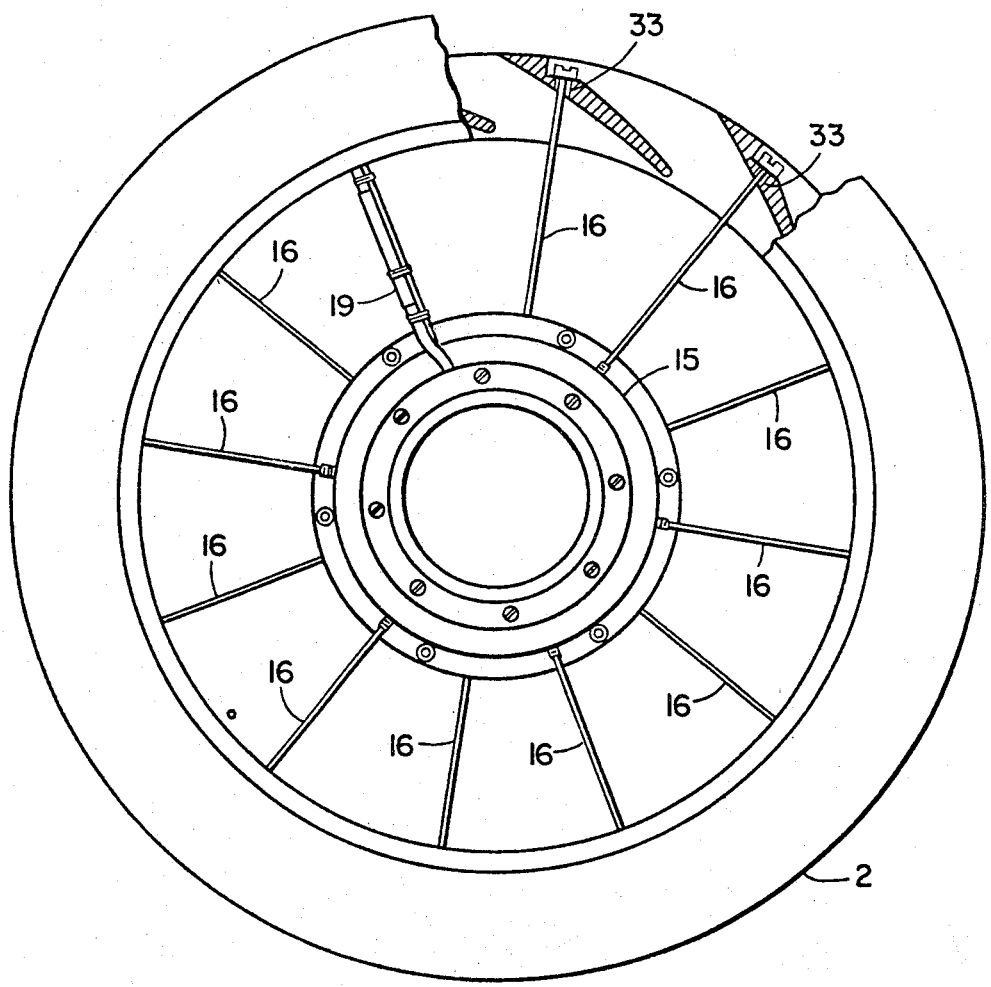

These and other objects and advantages of the invention will appear more fully hereinafter from a consideration of the detailed description which follows, taken together with the accompanying drawings wherein one embodiment of the invention is illustrated by way of example. It is to be understood, however, that the drawings are for the purpose of illustration only and are not a definition of the limits of the invention, reference being had to the appended claims. In the drawings, FIG. 1 is a partial cut-away view of a generator having a bearing support constructed according to the invention, and FIG. 2 is an elevation view of the novel bearing support.

Referring to the drawings, the novel bearing support is shown in connection with a generator 1 although it should be understood that the novel bearing support may be used in any rotating equipment utilizing bearings for rotatably supporting a shaft. In the present embodiment, main ball bearings 4 and 5 support an armature 3 for rotation in a housing 2. Bearing 4 has its outer race mounted firmly in housing 2 by bearing liner 6 and a clamping member 7 secured by retaining screws (not shown). The inner race of bearing 4 is secured to armature shaft 8 between a shoulder 10 and a snap ring 9.

The generator may be equipped with a bearing failure sensing device as described in U. S. Pat. No. 3,508,240, issued Apr. 21, 1970, and assigned to the same assignee as the present application. The bearing failure sensing device includes an auxiliary ball bearing 25 having its inner race secured to shaft 8 of armature 3 adjacent to main bearing 4 by a lock ring 26. Bearing liner 6 has a flange 20 adjacent auxiliary bearing 25 with a groove 21 extending around its inner periphery. A wire 22 is mounted in groove 21 of flange 20 by suitable insulation 23, such as epoxy. When liner 6 is machined some of the epoxy is cut away to expose a portion of wire 22. Bearing 25 preferably is of a diameter to provide a clearance of about 0.001 inch to 0.002 inch between the outer race of the bearing and flange 20. Wire 22 is connected by a conductor 28 to an indicator lamp 29 which may be connected to a power source.

As described in the above patent, auxiliary bearing 25 rotates with shaft 8 and normally is spaced from flange 20. When main bearing 4 fails, auxiliary bearing 25 contacts the exposed portion of wire 22 completing the circuit to lamp 29 to indicate a fault. The generator is shut down before any serious damage to the generator occurs.

The novel bearing support constructed according to the invention has a hub 15 for mounting main ball bearing 5, which rotatably supports the other end of armature 3, and an auxiliary ball bearing 13 to avoid damage to the generator as described above in case of failure of the main bearing. Main bearing 5 has its outer race secured to hub 15 between a shoulder 14 and a clamping member 17 held in place by retaining screws 18. The inner race of bearing 5 is secured to shaft 8 between a shoulder 11 on the shaft and a snap ring 12.

Auxiliary bearing 13 has its inner race secured to shaft 8 between snap rings 12 and 12a and the bearing rotates with the shaft similarly to auxiliary bearing 25. Hub 15 has a flange 30 adjacent auxiliary bearing 13 with a groove 31 extending around its inner periphery. A wire 32 is mounted in groove 31 by insulation material and some of the insulation is cut away when the hub is machined to expose a portion of the wire as described above. Wire 32 is connected by a connector 19 to lamp 29. Auxiliary bearing 13 is of a diameter to provide a small clearance between its outer race and flange 30 and, in case of a malfunction of main bearing 5, operates in the same manner as auxiliary bearing 25 to light lamp 29.

Hub 15 is supported from housing 2 by a plurality of spokes 16 threaded into the hub and extending through holes 33 in the housing. In the present embodiment spokes 16 are arranged in two rows of six spokes each with the spokes in the two rows displaced from one another by 30°. The spokes are tightened sufficiently to prestress the spokes so that a tension of 5,000 to 10,000 pounds per square inch still remains in the spokes at the lowest operating temperature. The support is designed so that at maximum operating temperature, which produces the maximum tension in the spokes, the bearing support bore will not increase in diameter by more than 0.0002 inch.

The novel bearing support permits the bearing supported thereby to be firmly mounted in the hub so that pounding of the bearing is avoided. The support provides a rigid mount for the bearing in a radial direction which requires approximately 250 pounds to deflect the bearing and rotor assembly 0.001 inch. The support provides a soft flexible mount in an axial direction requiring approximately only 0.9 pounds per 0.001 inch displacement. Air flow through the generator is not restricted by the bearing and its supporting members. The support accommodates a bearing failure detector as described and claimed in U. S. Pat. No. 3,508,241. Prestressing the spokes maintains tension on the spokes throughout the usable temperature range and normal alignment of the bearings is maintained.

I claim:

1. In a device having ball bearings for providing relative rotation between two members with different temperature coefficients, the bearings being fixedly secured to one of the members, supports on the other member for fixedly securing the bearings, at least one of said supports including a plurality of spokes for supporting the one support from the associated member for accommodating differential expansion in an axial direction between the members due to temperature changes without overstressing either bearing in the thrust mode.

2. A device as described in claim 1 in which the spokes are prestressed to maintain the spokes in tension throughout the usable temperature range.

3. A device as described in claim 2 which includes means for adjusting the tension of the spokes.

4. A support for a bearing as described in claim 1 in which the spokes are arranged in a plurality of rows.

5. A generator having a housing of one material and a rotor shaft of another material, the materials having different temperature coefficients, a ball bearing fixedly secured to the shaft and housing proximate one end and supporting the shaft for rotation relative to the housing, a bearing support proximate the opposite end of the housing and having a hub mounted by spokes from the housing, a ball bearing fixedly secured in the hub and to the shaft for mounting the shaft for rotation relative to the housing, the spokes being formed and arranged to prevent radial movement of the associated bearing but permitting axial movement of the bearing to accommodate unequal changes in dimensions of the rotor shaft and housing with changes in temperature without overstressing either bearing in the thrust mode.

6. A generator as described in claim 5 in which the spokes of the bearing support are prestressed to maintain the spokes in tension throughout the usable temperature range.

7. A support for a ball bearing secured to a shaft and supporting the shaft for rotation relative to a member wherein the shaft and member have different temperature coefficients, comprising a hub for firmly supporting the bearing, and a plurality of spokes connected to the hub for supporting the hub from the member, the spokes preventing movement of the bearing in a radial direction and permitting limited movement of the bearing relative to the member in an axial direction to accommodate unequal changes in dimensions of the shaft and member with changes in temperature.

8. A bearing support as described in claim 7 in which the spokes are prestressed to maintain the spokes in tension throughout the usable temperature range.

9. A bearing support as described in claim 8 which includes means for adjusting the tension of the spokes.

* * * * *